(12) United States Patent
Hajri et al.

(10) Patent No.: US 11,415,260 B2
(45) Date of Patent: Aug. 16, 2022

(54) ROBOTIC INSPECTION DEVICE FOR TANK AND PIPE INSPECTIONS

(71) Applicant: Saudi Arabian Oil Company, Dhahran (SA)

(72) Inventors: Amer D. Hajri, Abqaiq (SA); Rashid D. Al Hajri, Abqaiq (SA); Fikri A. Suwailah, Al-Hasa (SA); Kazem H. Al Musabbeh, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 263 days.

(21) Appl. No.: 16/676,240

(22) Filed: Nov. 6, 2019

(65) Prior Publication Data

US 2021/0131604 A1 May 6, 2021

(51) Int. Cl.
*G01B 7/06* (2006.01)
*G01N 27/82* (2006.01)
(Continued)

(52) U.S. Cl.
CPC .............. *F16L 55/26* (2013.01); *G01B 7/105* (2013.01); *G01N 27/82* (2013.01); *G06T 7/001* (2013.01);
(Continued)

(58) Field of Classification Search
CPC ... F16L 55/26; F16L 2001/30; F16L 2101/30; G01N 27/82; G06T 7/001; H04N 5/2253;
(Continued)

(56) References Cited

U.S. PATENT DOCUMENTS

| 4,722,142 A | 2/1988 | Schmidt |
| 5,343,146 A | 8/1994 | Koch et al. |

(Continued)

FOREIGN PATENT DOCUMENTS

| CN | 106123956 | 11/2016 |
| CN | 106548469 | 3/2017 |

(Continued)

OTHER PUBLICATIONS

WO-0111317 A1 English Machine Translation, retrieved from Espacenet (Year: 2001).*

(Continued)

*Primary Examiner* — Minh Q Phan
(74) *Attorney, Agent, or Firm* — Fish & Richardson P.C.

(57) ABSTRACT

Robotic inspection device for tank and pipe inspections includes a housing configured to be positioned on a portion within a flow apparatus. The portion has a wall with a coating on the wall. The coating has a coating thickness. The device has a magnetic transducer mounted to the housing. The magnetic transducer is configured to measure a magnetic flux permeability through the coating on the wall. A computer system is mounted to the housing. The computer system is operatively coupled to the magnetic transducer. The computer system includes one or more processors and a computer-readable medium storing instructions executable by the one or more processors to perform operations. The operations include receiving magnetic flux permeability measured by the magnetic transducer at a location on the portion and determining a coating thickness at the location based on the magnetic flux permeability measured at the location.

18 Claims, 8 Drawing Sheets

(51) Int. Cl.
    *G06T 7/00*     (2017.01)
    *F16L 55/26*     (2006.01)
    *H04N 5/225*     (2006.01)
    *H04N 5/232*     (2006.01)
    *F16L 101/30*     (2006.01)

(52) U.S. Cl.
    CPC ......... *H04N 5/2253* (2013.01); *H04N 5/2256* (2013.01); *H04N 5/23203* (2013.01); *F16L 2101/30* (2013.01); *H04N 2005/2255* (2013.01)

(58) Field of Classification Search
    CPC ............. H04N 5/2256; H04N 5/23203; H04N 2005/2255; G01B 7/105–7/107
    See application file for complete search history.

(56) References Cited

U.S. PATENT DOCUMENTS

| | | | |
|---|---|---|---|
| 9,726,569 | B2 | 8/2017 | Koyanagi |
| 9,739,721 | B2 | 8/2017 | Perez et al. |
| 9,753,461 | B1 | 9/2017 | Johnson et al. |
| 10,030,803 | B2 | 7/2018 | Choi et al. |
| 10,132,713 | B2 | 11/2018 | Choi et al. |
| 2002/0190682 | A1 | 12/2002 | Schempf et al. |
| 2010/0180672 | A1 | 7/2010 | Zollinger |
| 2012/0256643 | A1 | 10/2012 | Langley et al. |
| 2013/0294677 | A1* | 11/2013 | Urano ............... G06T 7/001 382/141 |
| 2017/0366868 | A1* | 12/2017 | Otsuka .............. A61B 1/00011 |
| 2019/0139215 | A1 | 5/2019 | Starr et al. |
| 2021/0149399 | A1 | 5/2021 | Lodhi et al. |

FOREIGN PATENT DOCUMENTS

| | | | |
|---|---|---|---|
| CN | 107483835 | 12/2017 | |
| CN | 107607465 | 1/2018 | |
| CN | 107807171 | 3/2018 | |
| CN | 108680644 | 10/2018 | |
| CN | 109035202 | 12/2018 | |
| CN | 109459377 | 3/2019 | |
| CN | 109490831 | 3/2019 | |
| EP | 2062659 | 5/2009 | |
| WO | WO-0111317 A1 * | 2/2001 | ............. G01B 7/003 |
| WO | WO 2004029564 | 4/2004 | |
| WO | WO 2018104790 | 6/2018 | |
| WO | WO 2019035856 | 2/2019 | |

OTHER PUBLICATIONS

PCT International Search Report and Written Opinion in International Appln. No. PCT/US2020/059053, dated Apr. 1, 2021, 22 pages.
Song et al., "Design of in-pipe robot based on inertial positioning and visual detection," Advances in Mechanical Engineering, Sep. 2016, XP055786930, 8(9) 1-22, 22 pages.
A.Hak Industrial Services [online], "Online Robotic Tank Bottom Inspection," retrieved on Oct. 14, 2019, from URL: <http://www.a-hak-is.com/en/home/what_we_do/markets/tank_storage/integrated_tank_services/inspection/online_robotic_tank_bottom_inspection> 2 pages.
Anvo et al., "Non-destructive testing robots (NDTBOTs) for in-service storage tank inspection," Journal of Mechanics Engineering and Automation, 8, pp. 103-109, Mar. 2018, 7 pages.
Square Robot [online], "Robotic Inspection of In-Service Diesel Storage Tank a Success," Published May 2019, retrieved Oct. 14, 2019, from URL: <http://squarerobots.com/news/pr-2019-05-29.html> 4 pages.
PCT International Search Report and Written Opinion in International Appln. No. PCT/US2020/059956, dated Feb. 18, 2021, 16 pages.
PCT Invitation to Pay Additional Fees and, Where Applicable, Protest Fee in International Appln. No. PCT/US2020/059053, dated Feb. 4, 2021.
Espinoza et al., "Navigation's Stabilization System of a Magnetic Adherence-Based Climbing Robot," Journal of Intelligent and Robotic Systems, Jul. 2014, 78(1): 65-81, XP035470751, 17 pages.
Mao et al., "Signal processing and defect analysis of pipeline inspection applying magnetic flux leakage methods," Intelligent Service Robotics, Springer Berlin Heidelberg, Aug. 2014, 7(4): 203-209, XP035395081, 7 pages.
Stanley, "Recent advances in robotic coiled tubular assessment," Insight—Non-destructive Testing and Condition Monitoring, Sep. 2007, 49(9): 524-531, XP055768545, 8 pages.
Tao et al., "Development of magnetic flux leakage pipe inspection robot using hall sensors," Micro-Nanomechatronics and Human Science, 2004 and the Forth Symposium Micro-Nanomechatronics for Information-Based Society, Proceedings of the 2004 International Symposium on Nagoya, Japan, Oct. 31- Nov. 3, 2004, XP010785963, 1-5, 5 pages.
GCC Examination Report in Gulf Cooperation Council Appln. No. GC 2020-40816, dated Oct. 29, 2021, 3 pages.
GCC Examination Report in Gulf Cooperation Council Appln. No. GC 2020-40889, dated Oct. 31, 2021, 3 pages.

* cited by examiner

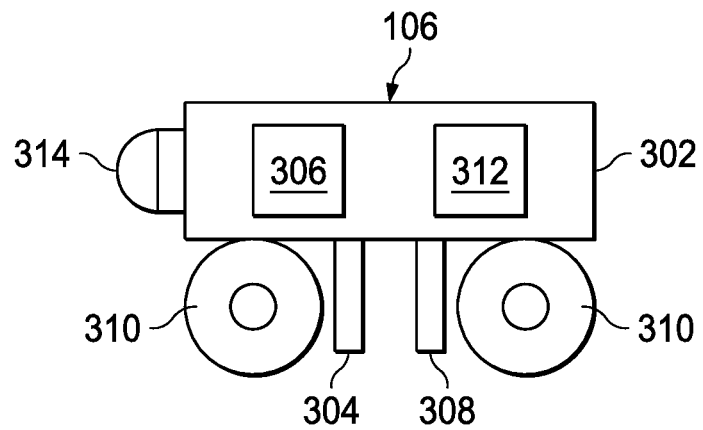
FIG. 3
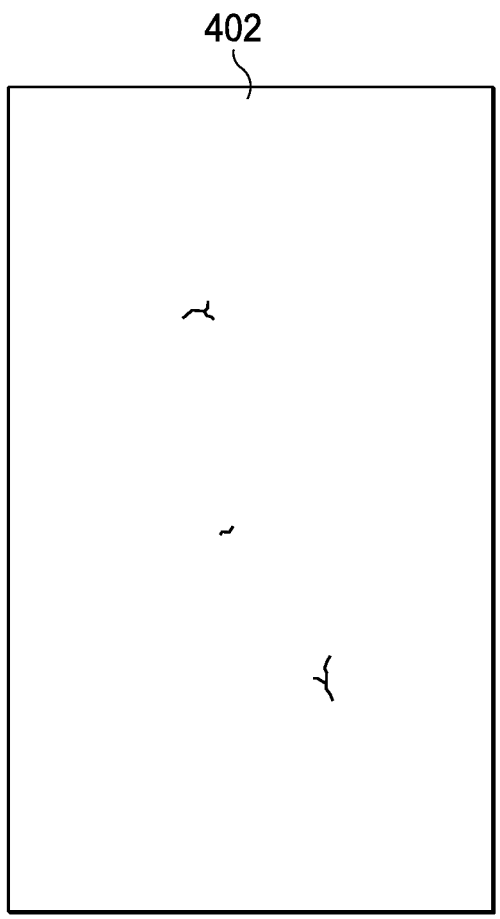 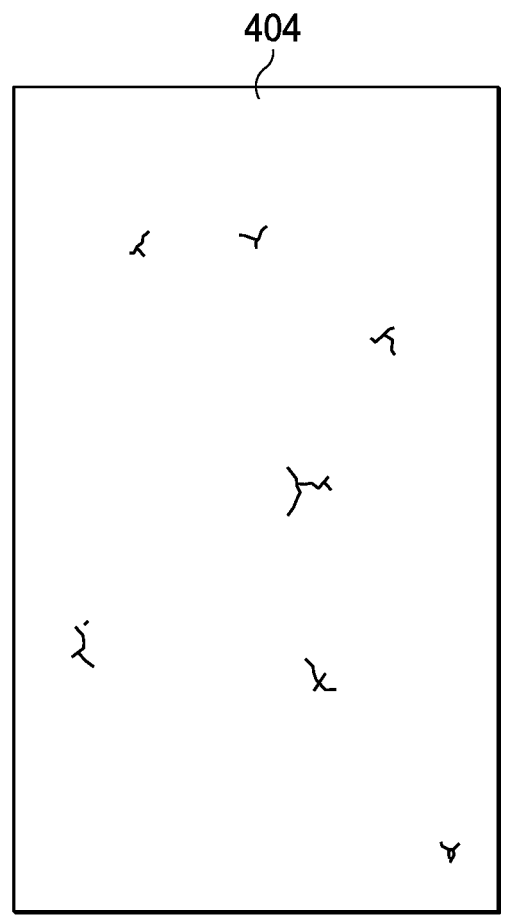
FIG. 4A    FIG. 4B

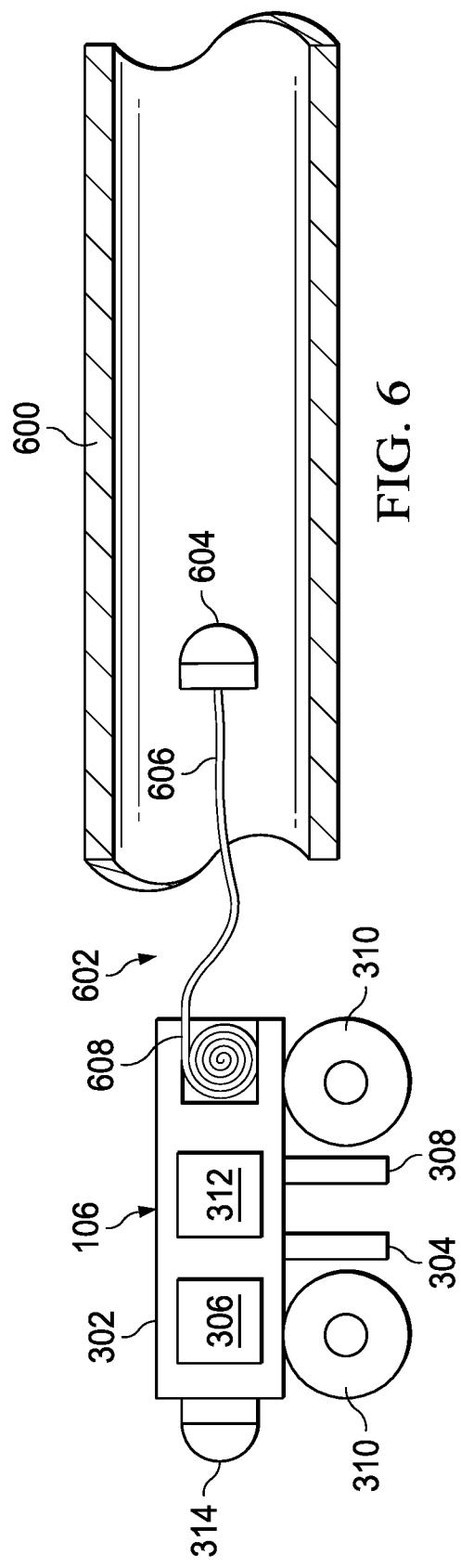

ROBOTIC INSPECTION DEVICE FOR TANK AND PIPE INSPECTIONS

TECHNICAL FIELD

This disclosure relates to inspecting fluid apparatuses, for example, tanks and pipes, in which and through which fluids, for example, hydrocarbons or other corrosive fluids are stored and flowed, respectively.

BACKGROUND

In the oil and gas industry, hydrocarbons, water and other fluids are either stored in storage tanks (sometimes called atmospheric storage tanks) or flowed through pipes or both. Due to the corrosive nature of water and water contained in the hydrocarbons, the surfaces of these storage tanks or pipes corrode or are otherwise damaged over time. Often, the surfaces are coated with a protective material, which can also deteriorate over time. When the storage tank or the pipe is being used or is in service, accessing the surfaces can present a challenge.

SUMMARY

This specification describes technologies relating to robotic inspection devices for tank and pipe inspections.

Certain aspects of the subject matter described here can be implemented as a robotic inspection device. The device includes a housing configured to be positioned on a portion within a flow apparatus. The portion has a wall with a coating on the wall. The coating has a coating thickness. The device has a magnetic transducer mounted to the housing. The magnetic transducer is configured to measure a magnetic flux permeability through the coating on the wall. A computer system is mounted to the housing. The computer system is operatively coupled to the magnetic transducer. The computer system includes one or more processors and a computer-readable medium storing instructions executable by the one or more processors to perform operations. The operations include receiving magnetic flux permeability measured by the magnetic transducer at a location on the portion and determining a coating thickness at the location based on the magnetic flux permeability measured at the location.

An aspect combinable with any other aspect includes the following features. The operations include storing a reference coating thickness value and a corresponding reference magnetic flux permeability value. To determine the coating thickness at the location based on the magnetic flux permeability measured at the location, a correlation between the magnetic flux permeability measured at the location is determined with the reference magnetic flux permeability value. The coating thickness is determined at the location based on the correlation.

An aspect combinable with any other aspect includes the following features. The device includes a transport mechanism mounted to the housing and operatively coupled to the computer system. The transport mechanism includes multiple wheels mounted to a bottom surface of the housing. The transport mechanism is configured to transport the robotic inspection device to multiple locations including the location on the portion. The operations include transmitting instructions to the transport mechanism to transport the robotic inspection device to each of the multiple locations. The transport mechanism is configured to transport the robotic inspection device to each of the multiple locations responsive to the instructions to transport the robotic inspection device. At each of the multiple locations, the operations include transmitting instructions to the magnetic transducer to measure a respective magnetic permeability flux. The magnetic transducer measures multiple magnetic permeability flux values at the respective multiple locations responsive to the instructions to measure the respective magnetic permeability flux at each of the multiple locations. The operations include determining multiple coating thickness values at the multiple locations based on the multiple magnetic permeability flux values.

An aspect combinable with any other aspect includes the following features. The device includes a camera mounted to the housing and operatively coupled to the computer system. The camera is configured to image the portion. The operations include transmitting instructions to the camera to image each of the multiple locations. The camera captures multiple images corresponding to the multiple locations. The operations include computationally analyzing the multiple images to determine a presence of defects on one or more locations of the multiple locations.

An aspect combinable with any other aspect includes the following features. To computationally analyze the multiple images to determine the presence of defects on one or more locations of the multiple locations, multiple first reference images are stored. Each first reference image is an image of a defect-free location of the portion. Multiple second reference images are stored. Each second reference image is an image of the portion with a defect. The multiple images are captured with the multiple first reference images and the multiple second reference images.

An aspect combinable with any other aspect includes the following features. To compare the multiple images with the multiple first reference images and the multiple second reference images to computationally analyze the multiple images to determine the presence of defects, a pixel-by-pixel comparison of each image of a particular location with a corresponding first reference image and a corresponding second reference image is performed.

An aspect combinable with any other aspect includes the following features. To compare the multiple reference images with the multiple images to computationally analyze the multiple images to determine the presence of defects includes performing a pixel group-by-pixel group comparison of each image of a particular location with a corresponding first reference image and a corresponding second reference image. A pixel group includes multiple image pixels.

An aspect combinable with any other aspect includes the following features. The operations include generating a two-dimensional defect map of the portion based on computationally analyzing the multiple images.

An aspect combinable with any other aspect includes the following features. The flow apparatus is a fluid storage tank. The portion is a bottom wall of the fluid storage tank.

An aspect combinable with any other aspect includes the following features. The flow apparatus is a pipe through which the fluid is configured to flow. The portion is a section of the pipe.

An aspect combinable with any other aspect includes the following features. The device includes a borescope attached to the housing and operatively coupled to the computer system. The borescope is configured to be inserted into an internal volume defined by the section of the pipe.

An aspect combinable with any other aspect includes the following features. The device includes a light source attached to the borescope. The light source is configured to illuminate the internal volume into which the borescope is inserted.

Certain aspects of the subject matter described here can be implemented as a computer-implemented method. A computer system mounted to a housing of a robotic inspection device positioned on a portion within a flow apparatus receives magnetic flux permeability measured by the magnetic transducer mounted to the housing and on a location on the portion. The computer system determines a coating thickness of a coating on a wall of the portion at the location based on the magnetic flux permeability measured at the location.

An aspect combinable with any other aspect includes the following features. A reference coating thickness value and a corresponding reference magnetic flux permeability value are stored. To determine the coating thickness at the location based on the magnetic flux permeability measured at the location, a correlation between the magnetic flux permeability measured at the location is determined with the reference magnetic flux permeability value. The coating thickness at the location is determined based on the correlation.

An aspect combinable with any other aspect includes the following features. The computer system transmits instructions to a transport mechanism mounted to the housing and operatively coupled to the computer system. The transport mechanism includes multiple wheels mounted to a bottom surface of the housing. The transport mechanism is configured to transport the robotic inspection device to multiple locations including the location on the portion. The instructions causing the transport mechanism to transport the robotic inspection device to each of the multiple locations. The transport mechanism is configured to transport the robotic inspection device to each of the multiple locations responsive to the instructions to transport the robotic inspection device. At each of the multiple locations, instructions are transmitted to the magnetic transducer to measure a respective magnetic permeability flux. The magnetic transducer measures multiple magnetic permeability flux values at the respective multiple locations responsive to the instructions to measure the respective magnetic permeability flux at each of the multiple locations. Multiple coating thickness values at the multiple locations are determined based on the multiple magnetic permeability flux values.

Certain aspects of the subject matter described here can be implemented as a computer-implemented method. A computer system is mounted on a robotic inspection device. Multiple first reference images are stored on the computer system. Each first reference image is an image of a defect-free location on a wall of the flow apparatus. The robotic inspection device is deployed on the wall in the flow apparatus. Multiple second reference images are stored on the computer system. Each second reference image is an image of a defective location on the wall of the flow apparatus. A camera is mounted on the robotic inspection device. Multiple images of multiple locations on the wall of the flow apparatus are received from the camera. The multiple images, the multiple first reference images, and the multiple second reference images are computationally analyzed to identify at least one defective location on the wall in the flow apparatus. The identified at least one defective location is transmitted to a receiver positioned external to the flow apparatus.

An aspect combinable with any other aspect includes the following features. To computationally analyze the multiple images, the multiple first reference images and the multiple second reference images, an image of each location is compared with each of the multiple first reference images and each of the multiple second reference images. Based on a result of the comparison, each location is classified as defective or defect-free.

An aspect combinable with any other aspect includes the following features. To compare the image of each location with each of the multiple first reference images and each of the multiple second reference images, a pixel-by-pixel comparison of each image of each location with each of the multiple first reference images and each of the multiple second reference images is performed.

An aspect combinable with any other aspect includes the following features. To compare the image of each location with each of the multiple first reference images and each of the multiple second reference images, a pixel group-by-pixel group comparison of each image of each location with each of the multiple first reference images and each of the multiple second reference images is performed. A pixel group includes multiple image pixels.

An aspect combinable with any other aspect includes the following features. The computer system receives from a magnetic transducer mounted on the robotic inspection device magnetic flux permeability measured by the magnetic transducer on a location on the portion. The computer determines a coating thickness of a coating on the wall based on the magnetic flux permeability measured at the location.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a schematic drawing of components of the robotic inspection device of FIGS. 1A and 2.

FIGS. 4A-4E are schematic drawings of reference images showing various degrees of coating cracking.

FIG. 6 is a schematic drawing of a robotic inspection device deployed in a pipe.

Like reference numbers and designations in the various drawings indicate like elements.

DETAILED DESCRIPTION

This disclosure describes a non-destructive testing (NDT) robotic crawler that performs indirect visual inspection and thickness measurements on surfaces of low apparatuses that come into contact with corrosive fluids like water and water contained in hydrocarbons. A storage tank that stores water and hydrocarbons or a pipe through which the water or hydrocarbons flow are examples of flow apparatuses. The robotic crawler (called robotic inspection device) can be deployed in a flow apparatus, for example, on a surface that is in contact with the fluid. In general, the robotic inspection device described here can be implemented in any flow apparatus carrying or flowing fluid through which light can be passed to illuminate the apparatus walls or surfaces. As described later, the robotic inspection device can perform visual inspection of the surface on which the device has been deployed as well as thickness measurements on coating disposed on the surfaces for protection against corrosion, or on pipe and tank wall.

Figure 1A:
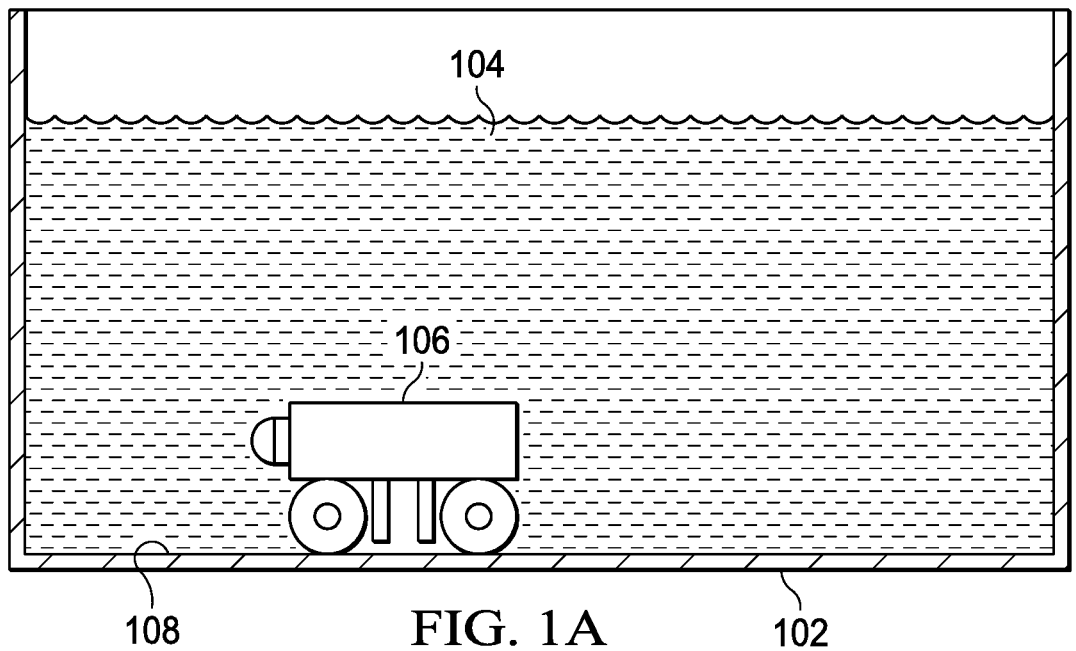
FIG. 1A is a schematic drawing of a robotic inspection device deployed in a storage tank.
Figure 1B:
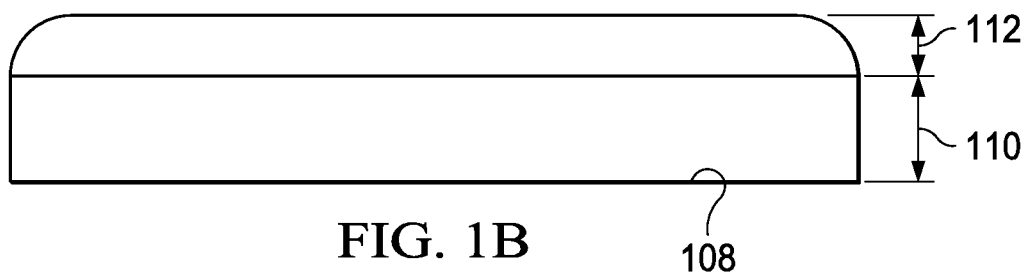
FIG. 1B is a schematic drawing of a bottom surface of the storage tank having a wall thickness and a coating thickness.

In an atmospheric storage tank, the bottom plate is typically protected from corrosion through application of two barriers, that is, a coating supplemented with cathodic protection in both product side (the surface that contacts the water, water contained in hydrocarbons, or other fluids) and soil side (the surface opposite to the surface that contacts the fluid). Inspecting and assessing tank bottom plate product side coating condition is a challenge that can be at least partially overcome by implementing the techniques described in this disclosure. In addition, the robotic inspection device described here can be implemented to increase the inspection effectiveness and to cover the overall surface of the flow apparatus being inspected. For example, the device can be implemented to inspect the bottom plate of storage tanks as well as inner surfaces of internally coated pipes and pipelines. Implementing the techniques described here can enable inspecting online flow apparatuses, for example, storage tanks that carry hydrocarbons with water as well as offline flow apparatuses, for example, pipes or pipelines through which the hydrocarbons with water flow. The techniques described here can release critical and decision making information useful to perform preventative maintenance and repairs instead of shutdown maintenance and repairs by offering online inspection FIG. 1A is a schematic drawing of a robotic inspection device 106 deployed in a storage tank 102. The storage tank 102 carries a fluid 104, water, hydrocarbons or other fluid. In particular, the robotic inspection device 106 can be deployed on a bottom surface 108 of the storage tank 102. FIG. 1B is a schematic drawing of the bottom surface 108 of the storage tank 102 having a wall thickness 110 and a coating thickness 112. In general, the storage tank 102 is made of a material that can resist, to a certain extent, damage due to the properties of the fluid 104. For example, the bottom surface 108 can be made of carbon steel or other ferrous-based materials. Sometimes, the bottom surface 108 can additionally be coated with a material that can increase the resistance to damage when the stored fluid imposes higher corrosion and deterioration to the wall. Such coating materials are usually organic-based such as epoxy coatings and are applied in liquid form and solidify to yield desired corrosion protection. As shown in the schematic drawing of FIG. 1B, the bottom surface 108 can have a wall thickness 110 and a coating on the bottom surface 108 can have a coating thickness 112. The robotic inspection device 106 is deployed on the coating. Prior to being implemented to store the fluid 104, the bottom surface 108 or the coating on the bottom surface 108 can be defect free. Over time, due to interactions (chemical, physical or both) between the fluids and the bottom surface 108 or the coating or both, the bottom surface 108 or the coating or both can become defective. The robotic inspection device 106 described here can be implemented to determine a degree or a quantity or both of the defects.

Figure 2:
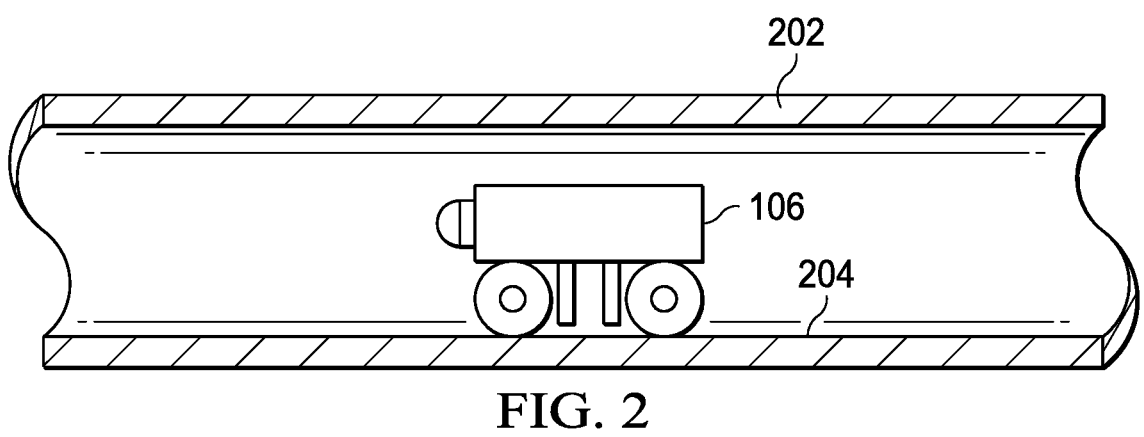
FIG. 2 is a schematic drawing of a robotic inspection device deployed in a pipe.

FIG. 2 is a schematic drawing of a robotic inspection device 106 deployed in a pipe 202. Fluids, hydrocarbons, or similar petroleum-based fluids, flow through the pipe 202. The pipe 202 has an internal diameter that is large enough to receive the robotic inspection device 106. The inner wall 204 of the pipe 202 can be made of the same or substantially similar material as the bottom surface 108 of the storage tank 102 described earlier with reference to FIG. 1A. The inner wall 204 has a wall thickness and can have a coating with a coating thickness, either or both of which can be damaged over time due to interactions between the flowing fluid and the inner wall 204. The robotic inspection device 106 described here can be implemented to similarly determine a degree or a quantity or both of the defects. Additional examples of flow apparatuses in which the robotic inspection device 106 can be deployed include, but are not limited to, oil and gas drums, low pressure spheroid tanks and high pressure sphere tanks.

FIG. 3 is a schematic drawing of components of the robotic inspection device 106 of FIGS. 1A and 2. The robotic inspection device 106 includes a housing 302 that can be positioned on a portion within a flow apparatus. For example, the portion is the bottom surface 108 of the storage tank 102 or the inner wall 204 of the pipe 202. The housing 302 is made of a material that is resistant to the fluid within the flow apparatus, for example, corrosion-resistant stainless steel, nickel alloy, high strength plastic or composite materials. As described earlier, the portion of the flow apparatus has a wall with a coating on the wall, and the coating has a coating thickness.

The robotic inspection device 106 has a magnetic transducer 304 mounted to the housing 302. The magnetic transducer 304 can measure a magnetic flux permeability through the coating on the wall. The robotic inspection device 106 has one or more magnets (for example, electromagnets powered by a power source such as a battery) mounted to the housing 302. The magnets produce the magnetic field for the magnetic flux permeability measurement. In some implementations, the magnetic transducer 304 is mounted on an underside of the housing 302 such that the magnetic transducer 304 is between the housing 302 and the wall of the portion of the flow apparatus when the robotic inspection device 106 is deployed on the portion. The coating on the wall is typically organic and therefore non-magnetic. Consequently, the magnetic flux permeability of the coating is inversely proportional to the coating thickness. The robotic inspection device 106 uses the correlation between the coating thickness and the magnetic flux permeability to measure the coating thickness.

In some implementations, the robotic inspection device 106 includes a computer system 306 that is mounted to the housing 302 and operatively coupled to the magnetic transducer 304. The computer system 306 includes one or more processors and a computer-readable medium storing instructions executable by the one or more processors to perform operations. The operations include receiving magnetic flux permeability measured by the magnetic transducer 304 at a location on the portion, and then determining a coating thickness at the location based on the magnetic flux permeability measured at the location.

To do so, in some implementations, the computer system 306 stores a reference coating thickness value and a corresponding reference magnetic flux permeability value for the location on the portion at which the magnetic transducer 304 measures the magnetic flux permeability. The reference coating thickness value represents a coating thickness at or above which the coating on the wall is sufficiently thick for the coating to be considered defect free. Below the reference coating thickness value, the coating is considered defective. In some implementations, the reference coating thickness value can be obtained from a manufacturer datasheet or from a calibration sample which is a small coated plate with pre-determined coating thickness. The reference magnetic flux permeability value represents a permeability of magnetic field through a coating having the reference coating thickness. Upon receiving the magnetic flux permeability from the magnetic transducer 304, the computer system 306 compares the received magnetic flux permeability to the stored reference coating thickness value. For example, the computer system 306 determines a correlation (for example, a ratio) between the received magnetic flux permeability and the reference coating thickness value. The computer system 306 determines the coating thickness at the location based on the correlation. For example, the computer system 306 multiplies the ratio by the reference coating thickness value to determine the coating thickness at the location at which the magnetic transducer 304 measured the magnetic flux permeability.

In some implementations, the robotic inspection device 106 includes a transport mechanism mounted to the housing 302 and operatively coupled to the computer system 306. For example, the transport mechanism includes multiple wheels 310 (for example, three wheels or four wheels) mounted to a bottom surface 108 of the housing 302 and controlled by a motor 312 mounted to the housing 302. The transport mechanism can also include an electrical power source (for example, a battery or electrical power cable), gears and shafts to facilitate transporting the robotic inspection device 106.

The transport mechanism can transport the robotic inspection device 106 to multiple locations on the portion. In the example of the storage tank 102, the transport mechanism can transport the robotic inspection device 106 to different locations on the bottom surface 108. In the example of the pipe 202, the transport mechanism can transport the robotic inspection device 106 to different axial locations on the inner wall. In some implementations, an operator can operate the transport mechanism, for example, a controller located external to the flow apparatus and operatively coupled to the transport mechanism by either wired or wireless connections or both. In some implementations, the robotic inspection device 106 can operate the transport mechanism independent of an operator. In such implementations, the robotic inspection device 106 can autonomously travel to different locations on the portion of the flow apparatus. In some implementations, the computer system 306 can associate, for example, tag, a magnetic permeability flux (or other measurement) captured at a location with geo-coordinates of the location. To do so, a global positioning system (GPS) or other coordinate determination system can be mounted to the robotic inspection device 106. In this manner, for each location on the portion of the flow apparatus to which the transport mechanism transports the robotic inspection device 106 and at which the robotic inspection device 106 measures properties of the portion of the flow apparatus, the computer system 306 can associate a location tag.

In one example, the computer system 306 transmits instructions to the transport mechanism to transport the robotic inspection device 106 to each of the multiple locations on the portion. In response, the transport mechanism transports the robotic inspection device 106 to each location, one location at a time. At each location, the computer system 306 transmits instructions to the magnetic transducer 304 to measure a respective magnetic permeability flux. In response, the magnetic transducer 304 measures multiple magnetic permeability flux values at the respective multiple locations. The computer system 306 determines multiple coating thickness values at the multiple locations based on the multiple magnetic permeability flux values. Also, the computer system 306 tags each magnetic permeability flux value measured at a particular location with the coordinates of that location. By doing so, the computer system 306 can generate a two or one dimensional map of magnetic permeability flux values across the portion of the wall of the flow apparatus, as described later.

In some implementations, the robotic inspection device 106 includes a camera 314 mounted to the housing 302 and operatively coupled to the computer system 306. The camera 314 can image the portion of the wall of the flow apparatus on which the robotic inspection device 106 is deployed. In some implementations, the camera 314 is a high definition frontline camera that can be rotated by 360° for a 3-D visual indirect examination. A white light source can be equipped with the camera 314 to perform white light visual inspection. The camera 314 can be equipped with a white light intensity meter to measure the white light intensity. Light intensity is measured to ensure the proper light intensity range is reached and effective remote visual inspection is maintained during examination. In some implementations, as the transport mechanism transports the robotic inspection device 106, the camera 314 can record instantaneous video jointly with time, location, and light intensity measurements. The computer system 306 can superimpose the time, location, and intensity measurements in the video or store the data separately. The computer system 306 can process the video and the data as described here.

For example, when the robotic inspection device 106 is at a location on the portion of the wall of the flow apparatus, the computer system 306 can transmit instructions to the camera 314 to image the portion. The captured image shows if the portion at the location is defect free or defective, and, if defective, the extent of the defect. Examples of visually inspected defects include wall corrosion or coating blistering, rusting, flaking, cracking, to name a few. Similar to obtaining multiple magnetic permeability flux values at the multiple locations described earlier, the computer system 306 can obtain multiple images of the multiple locations on the portion.

The computer system 306 can computationally analyze the multiple images to determine a presence of defects on one or more locations of the multiple locations. Such computational analysis can include in-situ storage and analytics of visual data, coating thickness, and plate thickness inspection with results generated in video format, analytical graphs, maps, and data tables. For visual inspection, for example, the computer system 306 can generate the type and intensity map of coating defects as a function of one or two dimensional distances in the bottom plate of the storage tank 102 or pipe 204. The computational analysis can also include differentiating between different types of defects. To do so, the computer system 306 can compare intensity reference images per defect and defect size images per defect as well as reference images of the defect to the visual data captured.

In some implementations, the computer system 306 can store reference images against which the computer system 306 can compare images captured by the camera 314. For example, the computer system 306 can store multiple first reference images. Each first reference image can be an image of a defect-free location. By "defect-free," it is not meant that the portion is completely devoid of defects.

Rather, it is meant that a quantity of defects in the imaged portion is below a threshold defect level such that the portion can be considered to be defect-free. The computer system 306 can also store multiple second reference images. Each second reference image can be an image of a defective portion, that is, the portion with a defect. By "defective," it is not meant that the portion is so defective as to be inoperable. Rather, it is meant that a quantity of defects in the imaged portion is above a threshold defect level such that the portion can be considered to be defective warranting repair or replacement. The computer system 306 can store reference images with defects ranging between defect-free and defective. The computer system 306 can compare the multiple images of the multiple locations of the portion of the flow apparatus with the multiple reference images, for example, the multiple first reference images and the multiple second reference images, to identify defective locations on the portion of the flow apparatus.

Figure 4E:
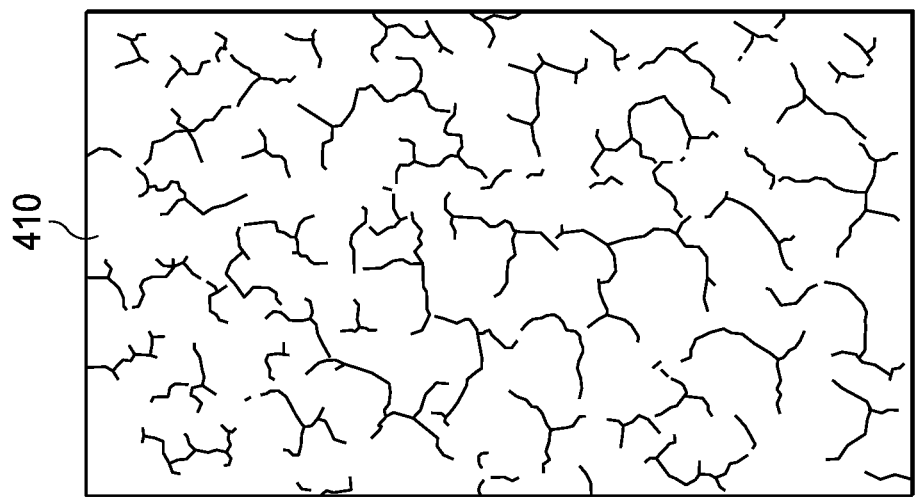
Figure 4D:
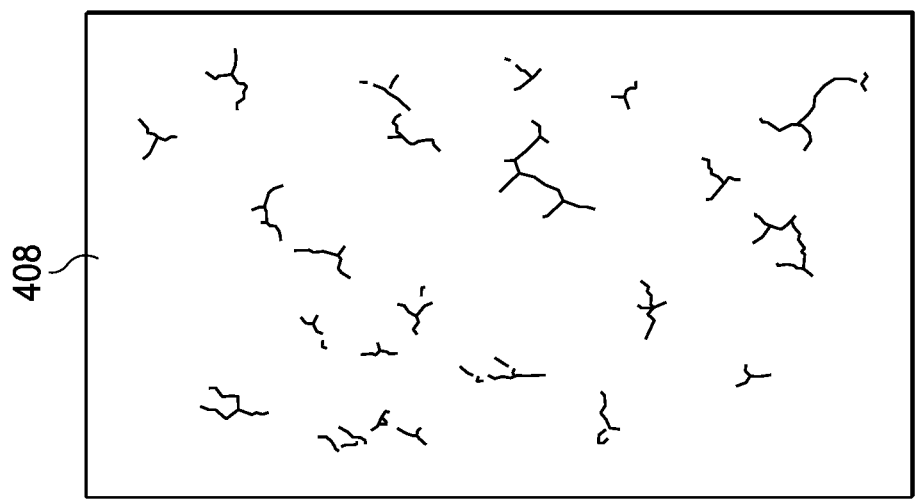
Figure 4C:
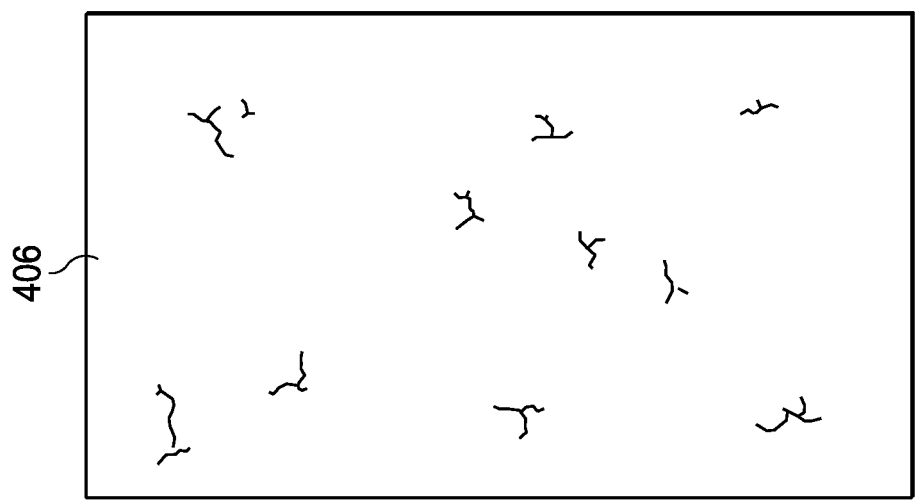

An example of visual inspection operations is described with reference to FIGS. 4A-4E, which are schematic drawings of reference images showing various degrees of coating cracking. For example, FIG. 4A shows a schematic of an image 402, which is an image of a location of the portion of the flow apparatus that is close to crack-free. FIG. 4B shows a schematic of an image 404, which is an image of a location of the portion of the flow apparatus that has more cracks than the location shown in image 402. Each of FIGS. 4C, 4D, and 4E shows a schematic of an image 406, an image 408, and an image 410, respectively, each of which is an image of a respective location of the portion with an increasing level of cracking. The schematic images shown in FIGS. 4A-4E can be different images of different locations of the portion of the flow apparatus. Alternatively, the schematic images can be images of the same location taken at different times, for example, as the level of cracking increases.

In some implementations, the computer system 306 receives an image of a location of the portion of the flow apparatus from the camera 314. The received image can have a quantity of cracking that ranges between as few as the cracks in image 402 and as much as the cracks in image 410. The computer system 306 can perform a pixel-by-pixel comparison of the received image with each of the reference images 402, 404, 406, 408, and 410 to determine the quantity of cracking in the received image. Alternatively, or in addition, the computer system 306 can perform a group of pixels-by-group of pixels comparison, wherein each group of pixels includes multiple pixels in the image. Based on a result of the comparison, the computer system 306 can identify a reference image that shows substantially the same quantity of cracking as the cracking in the received image.

Figure 5C:
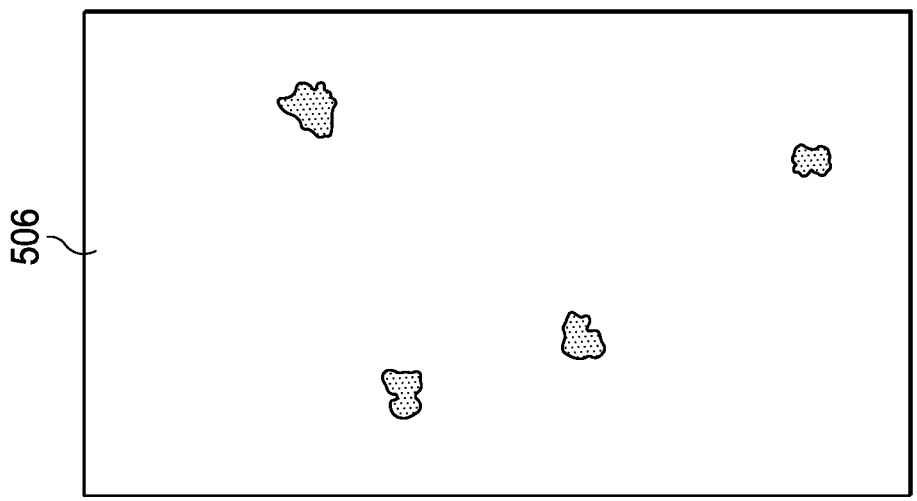
FIGS. 5A-5E are schematic drawings of reference images showing various degrees of coating flaking.
Figure 5B:
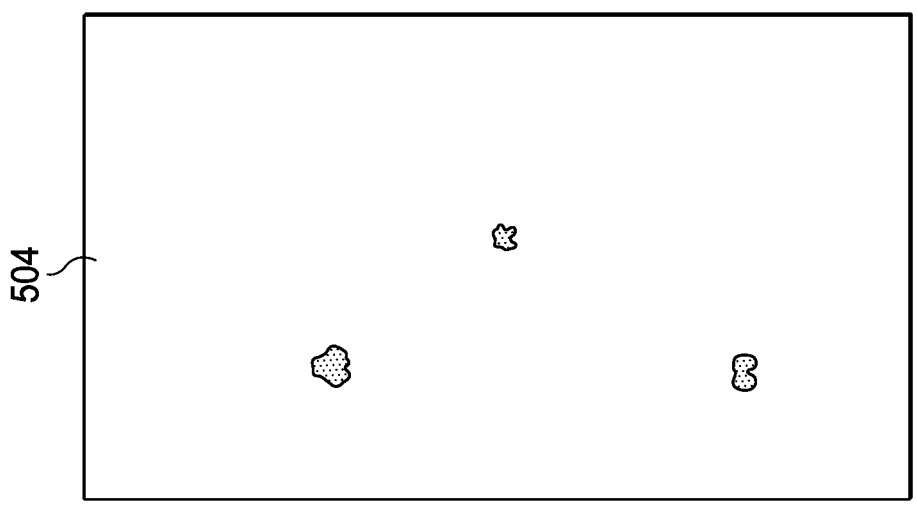
Figure 5A:
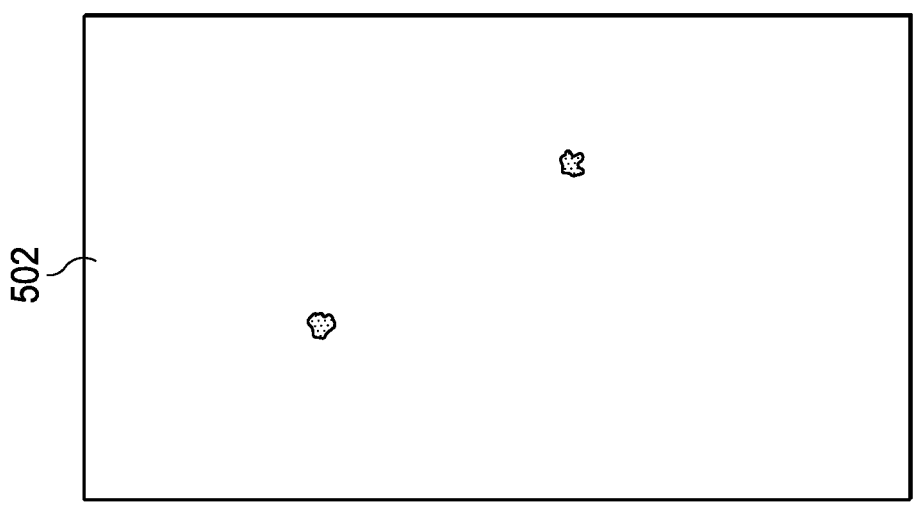
Figure 5D:
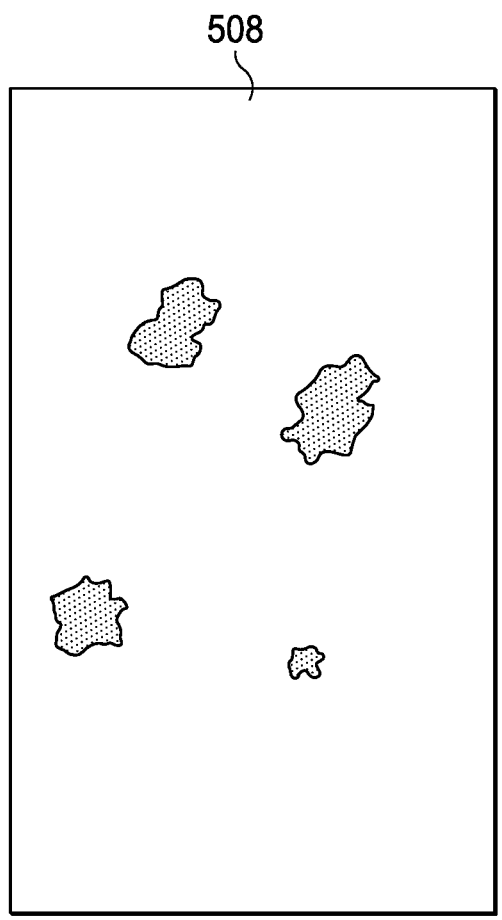
Figure 5E:
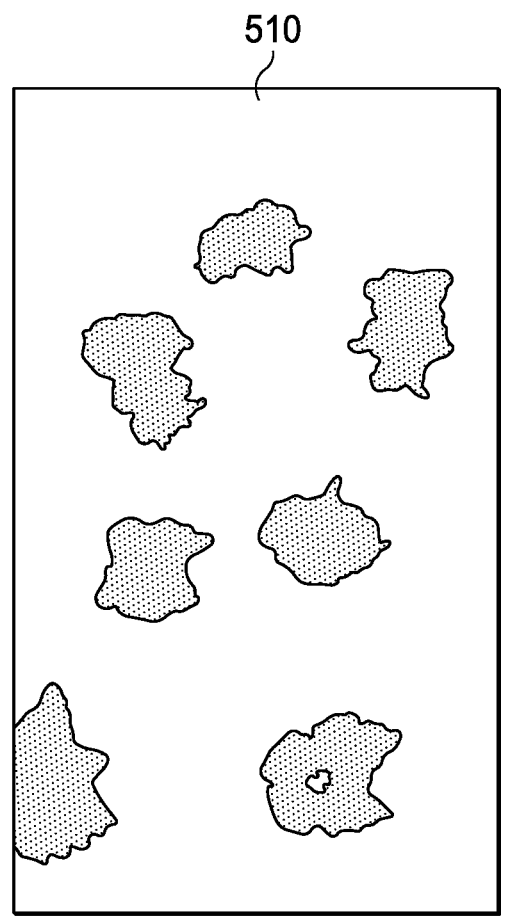

Another example of visual inspection operations is described with reference to FIGS. 5A-5E, which are schematic drawings of reference images showing various degrees of coating flaking. For example, FIG. 5A shows a schematic of an image 502, which is an image of a location of the portion of the flow apparatus that is close to flake-free. FIG. 5B shows a schematic of an image 504, which is an image of a location of the portion of the flow apparatus that has more flakes than the location shown in image 502. Each of FIGS. 5C, 5D, and 5E shows a schematic of an image 506, an image 508, and an image 510, respectively, each of which is an image of a respective location of the portion with an increasing level of cracking. The schematic images shown in FIGS. 5A-5E can be different images of different locations of the portion of the flow apparatus. Alternatively, the schematic images can be images of the same location taken at different times, for example, as the level of flaking increases. Similar to the operations described earlier with reference to inspecting for cracking, the computer system 306 receives an image of a location of the portion of the flow apparatus from the camera 314 and compares the image with the reference images shown in FIGS. 5A-5E. Based on a result of the comparison, the computer system 306 can identify a reference image that shows substantially the same quantity of flaking as the flaking in the received image.

Figure 9:
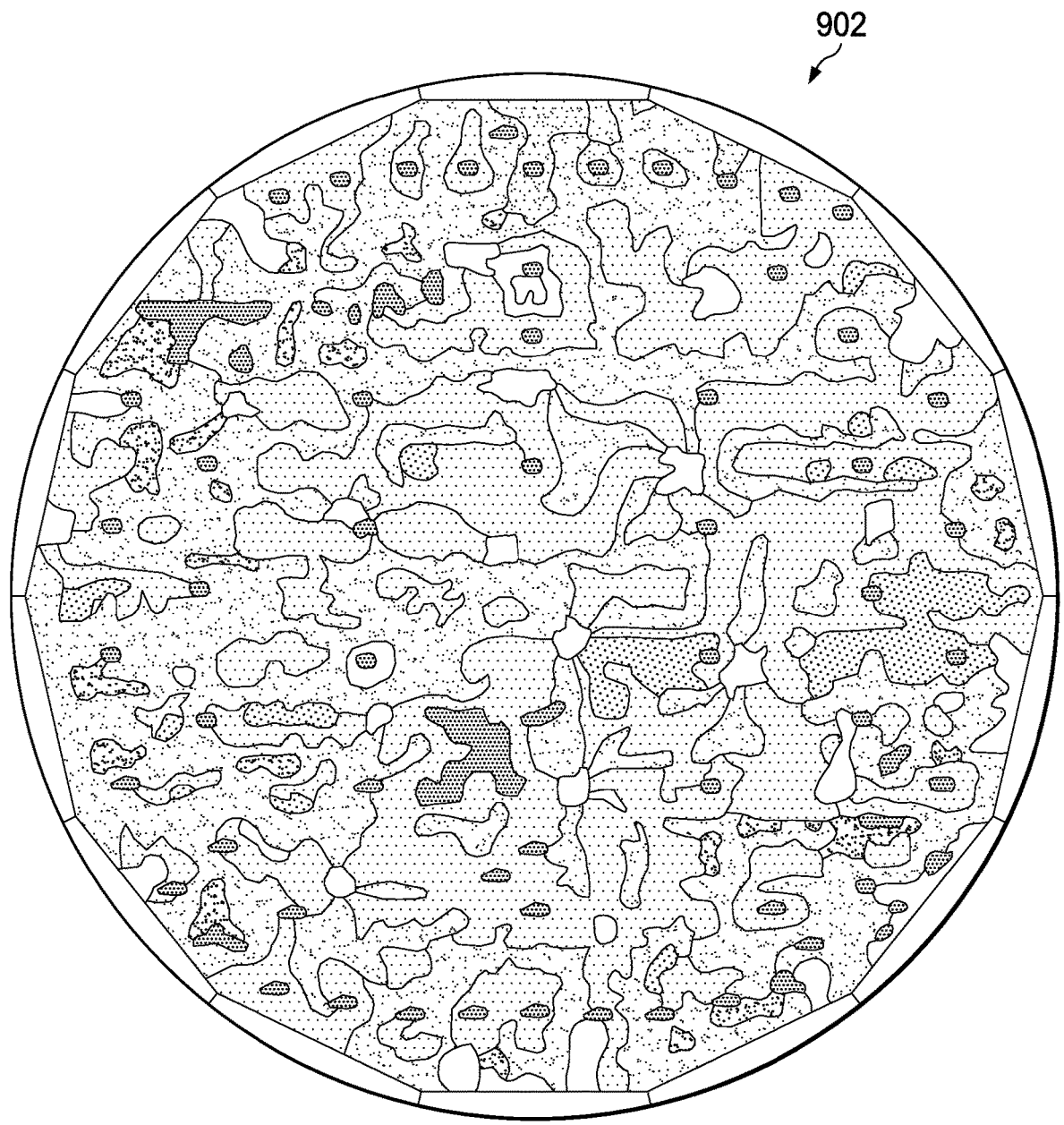
FIG. 9 is a schematic drawing of a two dimensional intensity map of coating defects.

After the camera 314 has captured an image of a location as described above with reference to FIGS. 4A-4E or FIGS. 5A-5E, the transport mechanism transports the robotic inspection device 106 to a different location on the portion of the flow apparatus, where the image capture is repeated. In this manner, multiple locations on the portion of the flow apparatus can be imaged, and each image can be visually inspected, as described earlier. For each image captured at each location, the computer system 306 can tag coordinates, as described earlier. Based on a result of the visual inspection and using the tag coordinates, the computer system 306 can generate a one or two dimensional intensity map of defects. FIG. 9 is a schematic drawing of such a two dimensional intensity map 902 for plate thickness. Similar intensity maps, for example, a thickness map, coating flaking map, coating cracking map, can be generated. In the schematic, different cross-hatchings represent different intensities. The intensities can be represented in colors, and the computer system 306 can be configured to modify the different intensities to increase or decrease the range of colors. For example, white can represent no corrosion or deterioration. The scale range can be adjusted by the user to focus or critical corrosion or coating deterioration areas In some implementations, the computer system 306 can store and apply a pre-inspection set up to facilitate different inspection functions such as travel speed, data storage frequency, and other functions relevant to the intended inspection. In some implementations, the robotic inspection device 106 can include an alarm or other output device that can send an output to the operator when a detected defect, coating thickness, or plate thickness fails to satisfy a corresponding defect threshold, coating thickness threshold, or plate thickness threshold, respectively, during inspection.

In some implementations, in addition to a magnetic transducer 304 determining coating thickness and a camera 314 four visual inspection, the robotic inspection device 106 can include an ultrasonic transducer 308 to measure and map a wall thickness of the portion of the flow apparatus. For example, the ultrasonic transducer 308 can be implemented to determine a wall thickness of the bottom surface 108 of the storage tank 102 or a wall thickness of the pipe 202. In some implementations, the ultrasonic transducer 308 is mounted on the underside of the housing 302 adjacent the magnetic transducer 304, such that the ultrasonic transducer 308 is between the housing 302 and the wall of the portion of the flow apparatus when the robotic inspection device 106 is deployed on the portion. By implementing the ultrasonic transducer 308 at different locations on the portion of the flow apparatus, the computer system 306 can develop a wall thickness profile across the portion of the flow apparatus. The computer system 306 can compare the wall thickness at the different locations with a reference wall thickness to identify locations at which the wall thickness fails a threshold thickness value. The computer system 306 can identify such locations as an output of the inspection.

FIG. 6 is a schematic drawing of a robotic inspection device 106 deployed in a pipe 600, having an inner diameter smaller than the robotic inspection device 106. In the example implementations described earlier, the robotic inspection device 106 was sized to fit within an internal volume defined by the flow apparatus, for example, the storage tank 102 or the pipe 202. In some implementations, the robotic inspection device 106 can be deployed to visually inspect an inner wall of a flow apparatus with an internal diameter that is too small to receive the entirety of the robotic inspection device 106 within. To do so, in some implementations, the robotic inspection device 106 includes a borescope 602 that can be introduced within the internal volume of the flow apparatus, for example, the pipe 600. The borescope 602 can include a camera similar to the camera 314, but sized to fit within the internal volume of the pipe 600. A light source 604 is attached to the camera of the borescope 602 and can illuminate the internal volume that is imaged by the camera. A cable 606 connects the borescope 602 to the housing 302 of the robotic inspection device 106. A cable coil 608 is mounted to the housing 302 to extend and retract the cable 606. In some implementations, images captured by the camera of the borescope 602 can be transmitted wirelessly to the computer system 306 of the robotic inspection device 106. In some implementations, the cable coil 608 can include optical fibers through which the images can be transmitted to the computer system 306. The housing 302 can also include a power source (for example, a battery or similar power source) for the borescope 602. The power source can power the light source 604, the camera and also the cable coil 608 for extension and retraction. In some implementations, a magnetic transducer can be mounted to the borescope 602, specifically, to the portion inserted into the pipe 600, to perform coating thickness measurement using techniques described earlier. Different sets of borescopes with different diameters can be included to cover different pipe diameters.

Figure 7:
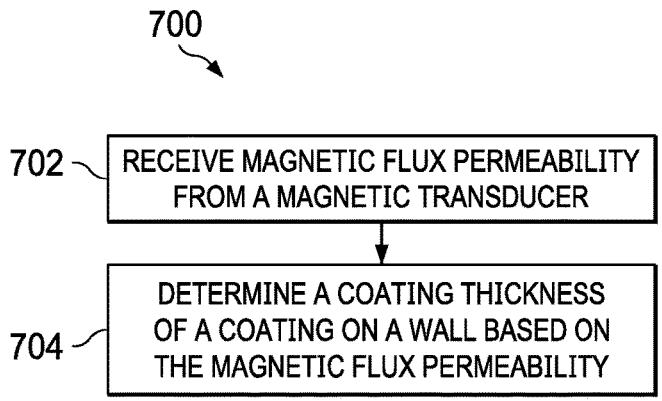
FIG. 7 is a flow chart of an example of a process of implementing the robotic inspection device to determine a coating thickness of a coating on a wall.

FIG. 7 is a flow chart of an example of a process 700 of implementing the robotic inspection device to determine a coating thickness of a coating on a wall. At 702, magnetic flux permeability measured by the magnetic transducer on a location on the portion of the flow apparatus is received by the computer system mounted to the housing of the robotic inspection device positioned on the portion within the flow apparatus. At 704, a coating thickness of a coating on a wall of the portion at the location is determined based on the magnetic flux permeability measured at the location. In additional process steps (not shown), multiple magnetic flux permeability values measured at respective, different locations on the wall are received. At each location and using each magnetic flux permeability value, a respective coating thickness is determined. A one or two-dimensional map of coating thickness across the multiple locations is generated. The map is transmitted to an external device (for example, an external computer with a display device) on which the map is displayed. Alternatively or in addition, locations at which the coating thickness fails to satisfy a threshold coating thickness are identified based on comparing the magnetic flux permeability value to a reference magnetic flux permeability value associated with an optimal coating thickness. Such locations are also transmitted to the external device, for example, to be displayed on the display device.

Figure 8:
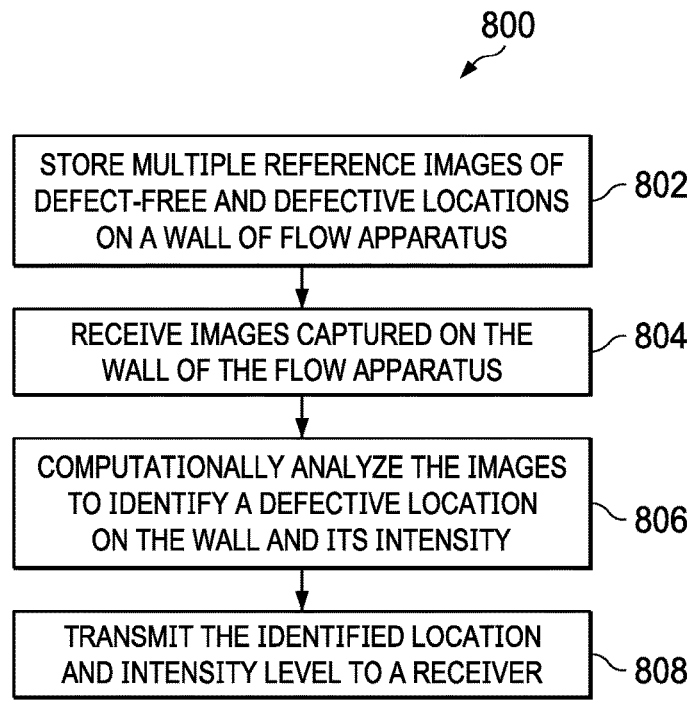
FIG. 8 is a flowchart of an example of a process of implementing the robotic inspection device to inspect a flow apparatus.

FIG. 8 is a flowchart of an example of a process 800 of implementing the robotic inspection device to inspect a flow apparatus. At 802, multiple reference images of defect-free and defective locations on a wall of a flow apparatus are stored on a computer system mounted on a robotic inspection device. At 804, multiple images of multiple locations on the wall of the flow apparatus are received from a camera mounted on the robotic inspection device. At 806, the multiple images and the multiple reference images are computationally analyzed to identify at least one defective location on the wall and its intensity in the flow apparatus. At 808, the identified at least one defective location and intensity level are transmitted to a receiver positioned external to the flow apparatus. In additional process steps (not shown), a one or two-dimensional map of visually-determined defects across the multiple locations is generated. The map is transmitted to the external device for display. Alternatively or in addition, locations at which the visually-inspected defects exceed a defect threshold are identified and transmitted to the external device, for example, to be displayed on the display device.

In some implementations, the robotic inspection device can simultaneously implement the magnetic transducer, the camera, and the ultrasonic transducer to perform multiple inspection options. In some implementations, only one or a combination of any two of the three inspection techniques can be implemented. The one or two-dimensional intensity map described here can be color coded with different colors representing different levels of defects or coating thicknesses or both.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A robotic inspection device comprising:
   a housing configured to be positioned on a portion within a flow apparatus, the portion having a wall with a coating on the wall, the coating having a coating thickness;
   a magnetic transducer mounted to the housing, the magnetic transducer configured to measure a magnetic flux permeability through the coating on the wall;
   a camera mounted to the housing, the camera configured to image the portion;
   a transport mechanism mounted to the housing, the transport mechanism comprising a plurality of wheels mounted to a bottom surface of the housing, the transport mechanism configured to transport the robotic inspection device to a plurality of locations including the location on the portion;
   a computer system mounted to the housing, the computer system operatively coupled to the magnetic transducer, the camera and the transport mechanism, the computer system comprising:
   one or more processors, and
   a computer-readable medium storing instructions executable by the one or more processors to perform operations comprising:
   receiving magnetic flux permeability measured by the magnetic transducer at a location on the portion,
   determining a coating thickness at the location based on the magnetic flux permeability measured at the location,
   transmitting instructions to the camera to image each of the plurality of locations, wherein the camera captures a plurality of images corresponding to the plurality of locations, and computationally analyzing the plurality of images to determine a presence of defects on one or more locations of the plurality of locations, and
generating a two-dimensional defect map of the portion based on computationally analyzing the plurality of images.

2. The robotic inspection device of claim 1, wherein the operations further comprise storing a reference coating thickness value and a corresponding reference magnetic flux permeability value, wherein determining the coating thickness at the location based on the magnetic flux permeability measured at the location comprises:
determining a correlation between the magnetic flux permeability measured at the location with the reference magnetic flux permeability value; and
determining the coating thickness at the location based on the correlation.

3. The robotic inspection device of claim 1, wherein the operations further comprise:
transmitting instructions to the transport mechanism to transport the robotic inspection device to each of the plurality of locations, wherein the transport mechanism is configured to transport the robotic inspection device to each of the plurality of locations responsive to the instructions to transport the robotic inspection device;
at each of the plurality of locations, transmitting instructions to the magnetic transducer to measure a respective magnetic permeability flux, wherein the magnetic transducer measures a plurality of magnetic permeability flux values at the respective plurality of locations responsive to the instructions to measure the respective magnetic permeability flux at each of the plurality of locations; and
determining a plurality of coating thickness values at the plurality of locations based on the plurality of magnetic permeability flux values.

4. The robotic inspection device of claim 1, wherein computationally analyzing the plurality of images to determine the presence of defects on one or more locations of the plurality of locations comprises:
storing a plurality of first reference images, each first reference image being an image of a defect-free location of the portion;
storing a plurality of second reference images, each second reference image being an image of the portion with a defect; and
comparing the plurality of images with the plurality of first reference images and the plurality of second reference images.

5. The robotic inspection device of claim 4, wherein comparing the plurality of images with the plurality of first reference images and the plurality of second reference images to computationally analyze the plurality of images to determine the presence of defects comprises performing a pixel-by-pixel comparison of each image of a particular location with a corresponding first reference image and a corresponding second reference image.

6. The robotic inspection device of claim 4, wherein comparing the plurality of reference images with the plurality of images to computationally analyze the plurality of images to determine the presence of defects comprises performing a pixel group-by-pixel group comparison of each image of a particular location with a corresponding first reference image and a corresponding second reference image, wherein a pixel group comprises a plurality of image pixels.

7. The robotic inspection device of claim 1, wherein the flow apparatus is a fluid storage tank, wherein the portion is a bottom wall of the fluid storage tank.

8. The robotic inspection device of claim 1, wherein the flow apparatus is a pipe through which the fluid is configured to flow, wherein the portion is a section of the pipe.

9. The robotic inspection device of claim 8, further comprising a borescope attached to the housing and operatively coupled to the computer system, the borescope configured to be inserted into an internal volume defined by the section of the pipe.

10. The robotic inspection device of claim 9, further comprising a light source attached to the borescope, the light source configured to illuminate the internal volume into which the borescope is inserted.

11. A computer-implemented method comprising:
receiving, by a computer system mounted to a housing of a robotic inspection device positioned on a portion within a flow apparatus and from a magnetic transducer mounted to the housing, magnetic flux permeability measured by the magnetic transducer on a location on the portion;
receiving, by the computer system and from a camera mounted to the housing and transported to a plurality of locations including the location of the portion by a transport mechanism mounted to the housing, an image of each of the plurality of locations;
computationally analyzing, by the computer system, the plurality of images to determine a presence of defects on one or more locations of the plurality of locations;
generating, by the computer system, a two-dimensional defect map of the portion based on computationally analyzing the plurality of images; and
determining, by the computer system, a coating thickness of a coating on a wall of the portion at the location based on the magnetic flux permeability measured at the location.

12. The method of claim 11, further comprising storing a reference coating thickness value and a corresponding reference magnetic flux permeability value, wherein determining the coating thickness at the location based on the magnetic flux permeability measured at the location comprises:
determining a correlation between the magnetic flux permeability measured at the location with the reference magnetic flux permeability value; and
determining the coating thickness at the location based on the correlation.

13. The method of claim 11, further comprising:
transmitting, by the computer system, instructions to the transport mechanism, the transport mechanism comprising a plurality of wheels mounted to a bottom surface of the housing, the transport mechanism configured to transport the robotic inspection device to a plurality of locations including the location on the portion, the instructions causing the transport mechanism to transport the robotic inspection device to each of the plurality of locations, wherein the transport mechanism is configured to transport the robotic inspection device to each of the plurality of locations responsive to the instructions to transport the robotic inspection device;
at each of the plurality of locations, transmitting instructions to the magnetic transducer to measure a respective magnetic permeability flux, wherein the magnetic transducer measures a plurality of magnetic permeability flux values at the respective plurality of locations responsive to the instructions to measure the respective magnetic permeability flux at each of the plurality of locations; and determining a plurality of coating thickness values at the plurality of locations based on the plurality of magnetic permeability flux values.

14. A computer-implemented method comprising:

storing, on a computer system mounted on a robotic inspection device, a plurality of first reference images, each first reference image being an image of a defect-free location on a wall of a flow apparatus, the robotic inspection device deployed on the wall in the flow apparatus;

storing, on the computer system, a plurality of second reference images, each second reference image being an image of a defective location on the wall of the flow apparatus;

receiving, from a camera mounted on the robotic inspection device, a plurality of images of a plurality of locations on the wall of the flow apparatus;

computationally analyzing, by the computer system, the plurality of images, the plurality of first reference images, and the plurality of second reference images to identify at least one defective location on the wall in the flow apparatus; and transmitting, by the computer system, the identified at least one defective location to a receiver positioned external to the flow apparatus.

15. The method of claim 14, wherein computationally analyzing, by the computer system, the plurality of images, the plurality of first reference images, and the plurality of second reference images comprises:

comparing an image of each location with each of the plurality of first reference images and each of the plurality of second reference images; and based on a result of the comparison, classifying each location as defective or defect-free.

16. The method of claim 15, wherein comparing the image of each location with each of the plurality of first reference images and each of the plurality of second reference images comprises performing a pixel-by-pixel comparison of each image of each location with each of the plurality of first reference images and each of the plurality of second reference images.

17. The method of claim 15, wherein comparing the image of each location with each of the plurality of first reference images and each of the plurality of second reference images comprises performing a pixel group-by-pixel group comparison of each image of each location with each of the plurality of first reference images and each of the plurality of second reference images, wherein a pixel group comprises a plurality of image pixels.

18. The method of claim 14, further comprising:

receiving, by the computer system and from a magnetic transducer mounted on the robotic inspection device, magnetic flux permeability measured by the magnetic transducer on a location on the portion; and determining, by the computer system, a coating thickness of a coating on the wall based on the magnetic flux permeability measured at the location.

* * * * *